(12) United States Patent
Barth et al.

(10) Patent No.: US 9,930,736 B2
(45) Date of Patent: Mar. 27, 2018

(54) LED CONVERTER AND METHOD FOR CONTROLLING A CONVERTER CIRCUIT OF AN LED CONVERTER

(71) Applicants: TRIDONIC GMBH & CO KG, Dornbirn (AT); TRIDONIC JENNERSDORF GMBH, Jennersdorf (AT)

(72) Inventors: Alexander Barth, Alberschwende (AT); Frank Horn, Engl (CH); Reinhold Juen, Dornbirn (AT); Frank Lochmann, Esseratsweiler (DE); Günter Marent, Bartholomäberg (AT); Florian Moosmann, Dornbirn (AT); Peter Pachler, Graz (AT)

(73) Assignees: TRIDONIC GMBH & CO KG, Dornbirn (AT); TRIDONIC JENNERSDORF GMBH, Jennersdorf (AT)

( * ) Notice: Subject to any disclaimer, the term of this patent is extended or adjusted under 35 U.S.C. 154(b) by 0 days.

(21) Appl. No.: 15/035,846

(22) PCT Filed: Nov. 11, 2014

(86) PCT No.: PCT/EP2014/074262
§ 371 (c)(1),
(2) Date: May 11, 2016

(87) PCT Pub. No.: WO2015/067819
PCT Pub. Date: May 14, 2015

(65) Prior Publication Data
US 2016/0316530 A1    Oct. 27, 2016

(30) Foreign Application Priority Data
Nov. 11, 2013  (DE) .......................... 10 2013 222 892

(51) Int. Cl.
| | | |
|---|---|---|
| *H05B 33/00* | (2006.01) | |
| *H05B 33/08* | (2006.01) | |
| *H05B 37/02* | (2006.01) | |

(52) U.S. Cl.
CPC ..... *H05B 33/0815* (2013.01); *H05B 33/0896* (2013.01); *H05B 33/0845* (2013.01); *H05B 37/0272* (2013.01); *Y02B 20/346* (2013.01)

(58) Field of Classification Search
CPC ............ H05B 37/0272; H05B 37/0227; H05B 37/0281; H05B 33/0803; H05B 33/0845;
(Continued)

(56) References Cited

U.S. PATENT DOCUMENTS

| | | | |
|---|---|---|---|
| 2007/0064832 A1 | 3/2007 | Frank | |
| 2009/0168843 A1* | 7/2009 | Waters | .................... G01S 19/34 375/130 |

(Continued)

FOREIGN PATENT DOCUMENTS

| | | |
|---|---|---|
| DE | 102010031244 A1 | 9/2011 |
| DE | 102012014308 A1 | 10/2013 |

(Continued)

OTHER PUBLICATIONS

Anonymous. AN-9729. LED Application Design Guide Using Half-Bridge LLC Resonant Converter for 100W Street Lighting. Internet Citation, Nov. 16, 2012 (Nov. 16, 2012), 1-14. http://www.fairchildsemi.com/an/AN/AN-9729.pdf.

(Continued)

*Primary Examiner* — Monica C King
(74) *Attorney, Agent, or Firm* — Seyfarth Shaw LLP; Brian Michaelis

(57) ABSTRACT

An LED converter (3) comprises a converter circuit (11) with potential separation (12). The converter circuit (11) has at least one controllable switching means (15). A control (Continued)

device (16) for switching the at least one controllable switching means (15) in a clocked manner is configured to modulate a switching frequency of the at least one controllable switching means (15) in order to transmit information across a potential barrier (12).

14 Claims, 4 Drawing Sheets

(58) Field of Classification Search
    CPC ............ H05B 33/0854; H05B 33/0872; H05B 37/0218; H05B 33/0815; H05B 33/089; H05B 33/0806; H05B 33/0896
    See application file for complete search history.

(56) References Cited

U.S. PATENT DOCUMENTS

| | | | |
|---|---|---|---|
| 2012/0007512 A1* | 1/2012 | Kim | ................... H05B 33/0827 315/152 |
| 2012/0274298 A1 | 11/2012 | Colbeck et al. | |
| 2013/0250627 A1 | 9/2013 | Herfurth | |

FOREIGN PATENT DOCUMENTS

| | | |
|---|---|---|
| DE | 102012017397 A1 | 10/2013 |
| EP | 0074848 A2 | 3/1983 |
| WO | 2005031944 A1 | 4/2005 |
| WO | 2007060128 A1 | 5/2007 |
| WO | 2008154736 A1 | 12/2008 |
| WO | 2009141111 A2 | 11/2009 |
| WO | 2013092656 A1 | 6/2013 |
| WO | 2013092662 A1 | 6/2013 |

OTHER PUBLICATIONS

International Search Report for PCT/EP2014/074262.
Austrian Search dated Nov. 11, 2014, 1 page.

* cited by examiner

LED CONVERTER AND METHOD FOR CONTROLLING A CONVERTER CIRCUIT OF AN LED CONVERTER

The invention relates to operating devices for illuminants. The invention relates in particular to operating devices with a converter circuit which have a potential barrier.

Converter circuits with potential separation serve to transmit electrical energy in a galvanically isolated manner from an input side to an output side. Such converter circuits are used in various applications for current or voltage supply, such as, for example, in clocked switching power supplies. In clocked converter circuits, controllable switching means are operated in a clocked manner in order to transmit electrical energy to the output side. Galvanically isolated energy transmission can be achieved by using a transformer or another transducer. Such galvanic isolation or potential separation is frequently required for safety reasons in operating devices for illuminants.

It can be desirable to transmit information between the galvanically isolated regions of an operating device for an illuminant. Optocouplers can be used for that purpose, in order to transmit information across the potential barrier. The use of such components increases the complexity and the costs of the circuit.

There is a need for devices and methods which allow information, such as, for example, status, brightness, colour or also operational state information, to be transmitted across a potential barrier of an operating device for an illuminant. There is a need in particular for such devices and methods with which information can be transmitted across the potential barrier in a simple manner.

According to exemplary embodiments of the invention, a switching frequency of a controllable switching means of a converter circuit is modulated in order to transmit information across a potential barrier. The information is transmitted by the converter circuit from an input side to an output side of the LED converter. Modulation of the switching frequency can be detected, for example, at a secondary coil of the converter circuit or in an LED current.

Since the information is transmitted by modulating the switching frequency of the controllable switching means of the converter circuit, it is not necessary to provide a separate optocoupler for transmitting the information. A control device for the controllable switching means on the primary side of the converter circuit can easily perform the modulation, for example by means of a so-called frequency sweep, in which the switching frequency is changed according to a frequency ramp.

An LED converter according to one exemplary embodiment comprises a converter circuit with potential separation. The converter circuit comprises at least one controllable switching means. The LED converter comprises a control device for the clocked switching of the at least one controllable switching means, wherein the control device is configured to modulate a switching frequency of the at least one controllable switching means in order to transmit information across a potential barrier.

The control device can be configured to change the switching frequency in at least one frequency ramp in order to transmit the information.

The control device can be so configured that the change of the switching frequency in the at least one frequency ramp leaves a temporal mean of an output current of the LED converter unchanged.

The at least one frequency ramp can be so defined that a temporal mean of an output current of the LED converter during the at least one frequency ramp corresponds to a predetermined LED current. The predetermined LED current can be specified by a user-defined dimming level or by a dimming level predetermined by a central brightness control.

The control device can be configured to effect the clocked switching of the controllable switching means in such a manner that the temporal mean of the output current of the LED converter in a time interval in which information is transmitted and in a further time interval in which no information is transmitted is the same.

The control device can be configured to specify a start frequency and/or an end frequency of the at least one frequency ramp in dependence on a set dimming level.

The information can comprise a sequence of data bits.

The control device can be configured to modulate the switching frequency of the at least one controllable switching means in dependence on the sequence of data bits. For the transmission of a data bit, the switching frequency can be changed in one frequency ramp or in more than one frequency ramp.

The converter circuit can be a DC/DC converter circuit.

The converter circuit can comprise an LLC resonant converter. The LLC resonant converter can have a half-bridge drive.

The control device can be configured to modulate the switching frequency of a first controllable switching means and of a second controllable switching means of a half-bridge circuit in order to transmit the information.

The control device can be configured to operate the LLC resonant converter resonantly or quasi-resonantly during the transmission of the information.

The control device can be provided on an input side of the LED converter. The control device can be provided in a region of the LED converter which is not a SELV (separated extra low voltage) region.

A demodulator can be provided for demodulating the transmitted information. The demodulator can be configured to detect the transmitted information in dependence on a frequency of a coil voltage of a secondary coil of the converter circuit.

The demodulator and the control circuit can be arranged on different sides of the potential barrier. The potential barrier can be a SELV barrier.

The LED converter can comprise a demodulator coupled with a secondary coil of the converter circuit. The demodulator can be configured to control or regulate a further converter, for example a down converter, in dependence on the transmitted information.

The demodulator can be integrated into an LED module or another illuminant.

The control device can be configured to transmit the information to an illuminant that comprises at least one light-emitting diode.

A system according to one exemplary embodiment comprises an LED converter according to one exemplary embodiment and an illuminant that comprises at least one light-emitting diode. The illuminant can be connected to the LED converter.

The illuminant can comprise at least one integrated semiconductor circuit for demodulating the information.

The integrated semiconductor circuit can be configured to control a further converter, for example a down converter, in dependence on the transmitted information.

The illuminant can be an LED module.

According to a further exemplary embodiment, a method for controlling a converter circuit of an LED converter is provided. The converter circuit comprises at least one controllable switching means. The method comprises switching the at least one controllable switching means in a clocked manner. The method comprises modulating a switching frequency of the at least one controllable switching means in order to transmit information across a potential barrier of the converter circuit.

The method can be carried out automatically by the LED converter or the system according to one exemplary embodiment.

Further features of the method according to exemplary embodiments and the effects achieved thereby correspond to the additional features of the LED converter or of the system according to different exemplary embodiments.

In order to transmit the information, the switching frequency can be changed in at least one frequency ramp.

The change in the switching frequency in the at least one frequency ramp can be carried out in such a manner that a temporal mean of an output current of the LED converter remains unchanged. A temporal mean of the output current, averaged over the duration of the frequency ramp, can be equal to a temporal mean of the output current before transmission of the information.

The at least one frequency ramp can be so defined that a temporal mean of an output current of the LED converter during the at least one frequency ramp corresponds to a predetermined LED current. The predetermined LED current can be specified by a user-defined dimming level or by a dimming level predetermined by a central brightness control.

The clocked switching of the controllable switching means can be effected in such a manner that the temporal mean of the output current of the LED converter in a time interval in which information is transmitted and the switching frequency is modulated, and in a further time interval in which no information is transmitted, is the same.

A start frequency and/or an end frequency of the at least one frequency ramp can be specified in dependence on a set dimming level.

The information can comprise a sequence of data bits.

The switching frequency of the at least one controllable switching means can be modulated in dependence on the sequence of data bits. For the transmission of a data bit, the switching frequency can be changed in one frequency ramp or in more than one frequency ramp.

The converter circuit can be a DC/DC converter circuit.

The converter circuit can comprise an LLC resonant converter. The LLC resonant converter can have a half-bridge drive.

The switching frequency of a first controllable switching means and of a second controllable switching means of a half-bridge circuit can be modulated in order to transmit the information.

The LLC resonant converter can be operated resonantly or quasi-resonantly during transmission of the information.

A control device for controlling the at least one controllable switching means can be provided in the method on an input side of the LED converter. The control device can be provided in a region of the LED converter which is not a SELV (separated extra low voltage) region.

The method can comprise detecting the transmitted information in dependence on a frequency of a coil voltage of a secondary coil of the converter circuit. A demodulator for detecting the transmitted information can be provided in a SELV region of the LED converter, in an LED module or another illuminant.

The demodulator and the control device can be arranged on different sides of the potential barrier. The potential barrier can be a SELV barrier.

In the method, the information can be transmitted to an illuminant that comprises at least one light-emitting diode.

The method can be used for unidirectionally transmitting the information across a potential barrier. The method can be used for unidirectionally transmitting the information to a SELV region of the LED converter or to an LED module.

The method can be used for bidirectionally transmitting information across a potential barrier.

An illuminant that comprises at least one light-emitting diode can be connected to the LED converter. The illuminant can be an LED module.

The transmitted information can be demodulated by an integrated semiconductor circuit of the lamp.

According to exemplary embodiments of the invention, a switching frequency of a controllable switching means can be modulated in order to transmit information across a potential barrier. The information can be transmitted in a simple manner via the converter via which energy for operating the illuminant is also transmitted.

The invention will be described in greater detail hereinbelow with reference to the accompanying drawing and preferred exemplary embodiments.

Figure 1:
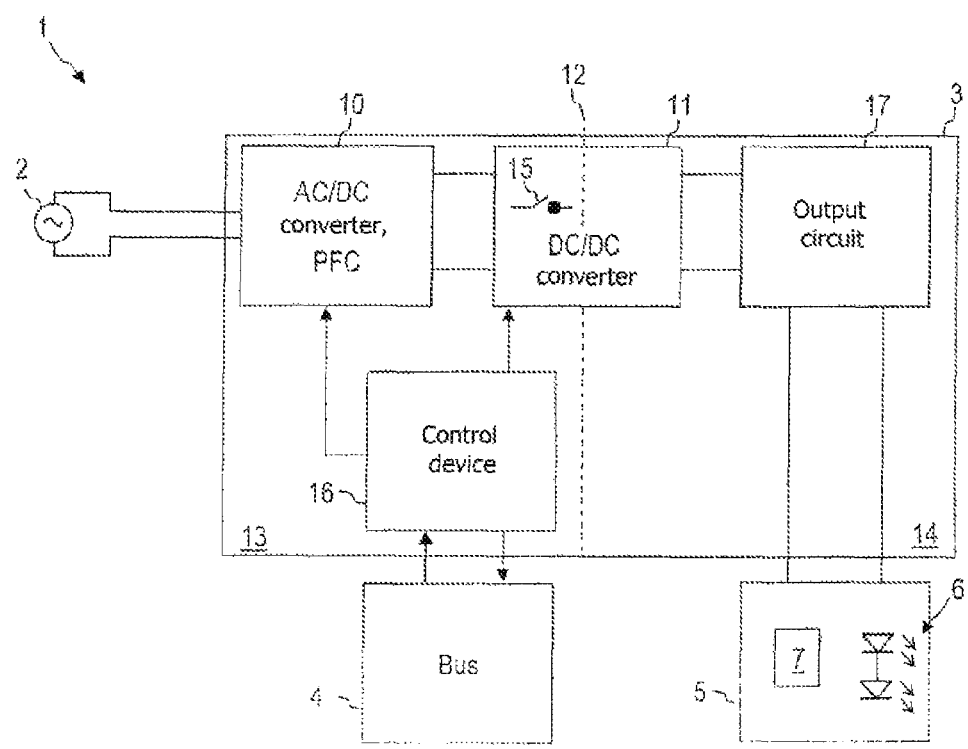
FIG. 1 shows a block diagram of a system having an LED converter according to one exemplary embodiment.

The invention will be described in greater detail hereinbelow by means of exemplary embodiments with reference to the figures, in which identical reference numerals denote identical or corresponding elements. The features of different exemplary embodiments can be combined with one another, provided that this is not explicitly excluded in the description. Although some exemplary embodiments will be described in greater detail in the context of specific applications, for example in the context of operating devices for LED modules, the exemplary embodiments are not limited to those applications.

FIG. 1 shows a system 1 in which an LED converter 3 according to one exemplary embodiment supplies an illuminant 5 with energy. The illuminant 5 can comprise one light-emitting diode (LED) or a plurality of LEDs. The LEDs 6 can be inorganic or organic LEDs. The LED converter 3 can optionally be connected to a bus 4 or a wireless communication system in order to receive dimming commands and/or give out status messages.

During operation, the LED converter 3 is coupled on the input side with a supply voltage source 2, for example a mains supply. The LED converter 3 can comprise a rectifier 10. The LED converter 3 can optionally comprise a power factor correction circuit (PFC, power factor correction). The LED converter 3 comprises a converter circuit 11. The converter circuit 11 can be a DC/DC converter, such as, for example, a flyback converter circuit.

The converter circuit 11 is in the form of a clocked converter circuit and has a controllable switching means 15. The controllable switching means 15 can be a power switch. The controllable switching means 15 can be a transistor with an isolated gate electrode. The controllable switching means 15 can be a MOSFET. As will be described in greater detail, the converter circuit 11 is a converter circuit clocked at the primary side, in which a control device 16 switches the controllable switching means 15 in a clocked manner. While only one controllable switching means 15 is shown schematically in FIG. 1, the converter circuit 11 can also have a plurality of primary-side controllable switching means, for example for a half-bridge drive of the converter circuit 11.

The converter circuit 11 can have galvanic isolation. A primary side of the converter circuit 11 and a secondary side of the converter circuit 11 can be galvanically isolated. A potential separation between different regions 13, 14 of the LED converter can thereby be produced. The output side 14 with the secondary side of the converter circuit can be in the form of a SELV (separated extra low voltage) region and can be separated from the input side 13 by a SELV barrier. The potential barrier 12 does not necessarily have to be a SELV barrier but can also be a different potential barrier, for example an ELV barrier.

The LED converter 3 can optionally have an output circuit 17 which is coupled with a secondary coil of the converter circuit 11. The output circuit 17 can comprise a down converter. Alternatively, the output circuit 17 can also be omitted, for example if the LED module comprises a down converter.

The LED converter 3 is designed to transmit information, such as, for example, status, brightness, colour or also operational state information, across the potential barrier 12. For the transmission of information, a control device 16 for controlling the controllable switching means 15 can modulate a switching frequency of the controllable switching means 15. As will be described in greater detail with reference to FIG. 2 to FIG. 8, the control device 16 can change the switching frequency in at least one frequency ramp. Changing the switching frequency in a frequency ramp is also referred to in the art as a frequency sweep.

A demodulator can detect the modulation of the switching frequency. To that end, the demodulator can monitor modulated signals, for example alternating current (AC) signal components of a voltage or of a current, on the secondary side of the converter circuit 11, in order to detect the transmitted information. The demodulator can be provided in a SELV region of the LED converter 3. The demodulator can be an integrated semiconductor circuit which controls the output circuit 17.

Alternatively or in addition, the demodulator can also be provided on an LED module 5 or in another illuminant. For example, the LED module 5 can comprise an integrated semiconductor circuit 7 which acts as a demodulator. The integrated semiconductor circuit 7 can detect modulated signals, such as alternating current (AC) signal components of an LED current. The integrated semiconductor circuit 7 can be configured to determine a frequency change of the AC signal components and thus read out the transmitted information.

The demodulator can be configured to detect, in dependence on an AC signal component of a voltage or of a current in the SELV region of the LED converter 3 or in the LED module 5, a switching frequency with which the primary-side control device 16 switches the primary-side controllable switching means 15 in a clocked manner. The demodulator can be configured to detect, in dependence on an AC signal component of a voltage or of a current in the SELV region of the LED converter 3 or in the LED module 5, whether a switching frequency of the primary-side controllable switching means 15 is changed in at least one frequency ramp. The demodulator can be configured to detect, in dependence on an AC signal component of a voltage or of a current in the SELV region of the LED converter 3 or in the LED module 5, the rate at which a switching frequency of the primary-side controllable switching means 15 is changed in at least one frequency ramp. The demodulator can be configured to detect, in dependence on an AC signal component of a voltage or of a current in the SELV region of the LED converter 3 or in the LED module 5, whether a switching frequency of the primary-side controllable switching means 15 is increased or reduced in at least one frequency ramp.

The transmitted information can be an analogue value and/or can comprise a sequence of data bits. The transmitted information can comprise a control command or data which are used in the SELV region 14 of the LED converter 3 or in the LED module 5 to perform a control or regulating function. For example, at least one further converter, for example a down converter, can be controlled or regulated in dependence on the transmitted information.

The information can be transmitted unidirectionally from the primary side of the converter circuit 11 to the secondary side of the converter circuit 11. The information can also be transmitted bidirectionally, for example in order to transmit at least one sensor value from the secondary side of the converter circuit 11 to the control device 16. To that end, at least one further controllable switching means can be provided on the secondary side of the converter circuit.

Since the information is transmitted across the potential barrier 12 by modulating the switching frequency of the controllable switching means 15, the same components are used for transmitting energy to the output side and for transmitting information to the output side. An integrated circuit, which can be used as a demodulator for detecting the modulation of the switching frequency on the output side 14 of the LED converter 3 or in the LED module 5, can at the same time perform further functions. For example, the integrated circuit used as a demodulator can also control or regulate a down converter, a flyback converter or another converter coupled with the secondary side of the converter circuit 11.

The switching frequency of the controllable switching means 15 controlled by the control device 16 can be modulated in various ways. The control device 16 can define a frequency ramp, in which the switching frequency is changed, in dependence on a desired value of an output current of the LED converter. The control device 16 can define the frequency ramp, in which the switching frequency is changed, in dependence on a dimming level. The control device 16 can define the frequency ramp in such a manner that an output current of the LED converter 3 averaged temporally over the frequency ramp has the same value as the mean of the output current in a further time interval in which the control device 16 does not change the switching frequency in a frequency ramp. In order to adjust the properties of the frequency ramp so that the temporal mean of the output current has a desired value, the control device 16 can influence various parameters of the frequency ramp. For example, the control device 16 can adjust a start frequency and/or an end frequency and/or a rate of change of the switching frequency during the frequency ramp and/or a duration of the frequency ramp. The control device 16 can determine at least one parameter of the frequency ramp on the basis of a characteristic diagram and/or by calculation.

The control device 16 can be configured to carry out the change of the switching frequency in at least one frequency ramp in dependence on the information to be transmitted. For example, the control device 16 can define a gradient, a duration, an amplitude or a direction of at least one frequency ramp in dependence on the information to be transmitted. The control device 16 can be configured to code information representing an analogue value in a gradient of at least one frequency ramp. The control device 16 can be configured, for the transmission of a sequence of data bits, selectively to change the switching frequency in at least one frequency ramp for each data bit, in dependence on the value of the data bit. Different values of a data bit can, for example, be coded in different gradients of a frequency ramp, different durations of a frequency ramp, different directions of the frequency ramp, different sequences of frequency ramps or with other modulation codes.

Figure 2:
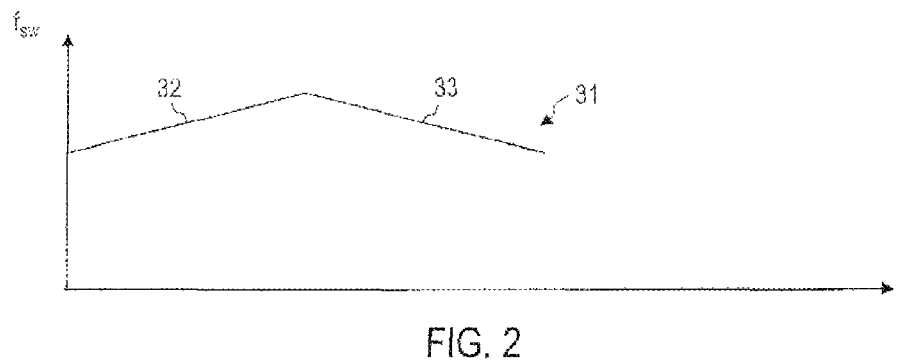
FIG. 2 shows a change of a switching frequency in at least one frequency ramp for the transmission of information in an LED converter according to one exemplary embodiment.
Figure 3:
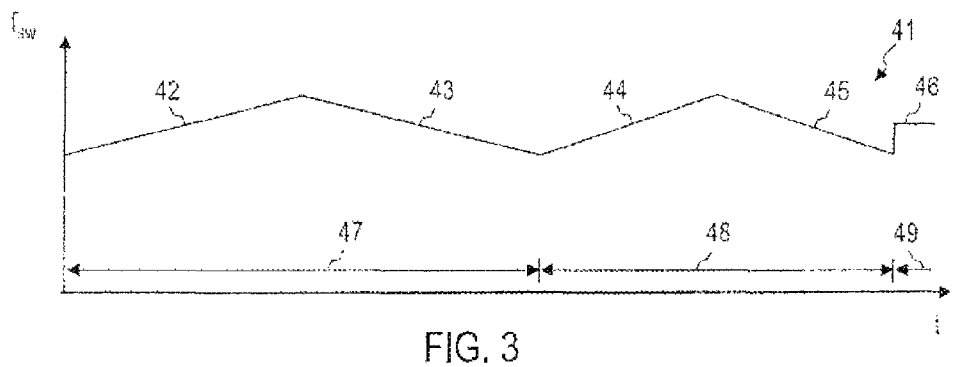
FIG. 3 shows a change of a switching frequency in at least one frequency ramp for the transmission of information in an LED converter according to a further exemplary embodiment.
Figure 4:
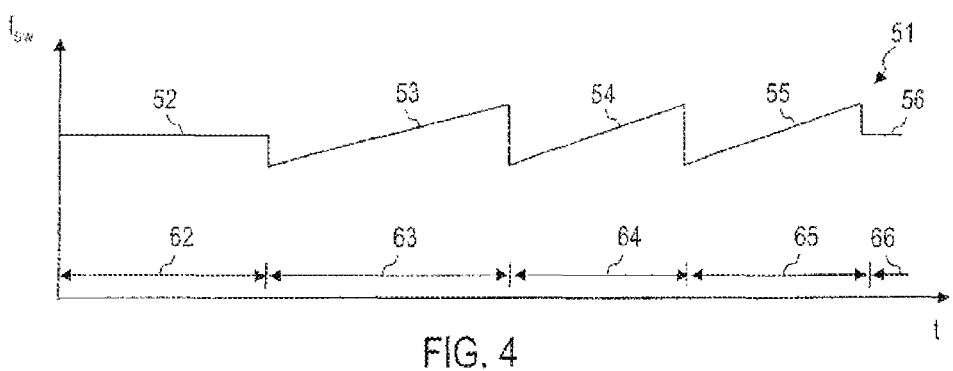
FIG. 4 shows a change of a switching frequency in at least one frequency ramp for the transmission of information in an LED converter according to a further exemplary embodiment.

FIG. 2 to FIG. 4 show by way of example the change of a switching frequency of the controllable switching means 15, as can be used in LED converters and methods according to exemplary embodiments. The corresponding change of the switching frequency can be carried out by the control device 16. The control device 16 can switch a primary-side controllable switching means in a clocked manner. A time interval between successive switching operations or between successive switching cycles, for example a time interval between switch-on operations, can be determined time-dependently in dependence on the respective switching frequency $f_{SW}$.

FIG. 2 shows a switching frequency 31 which is changed as a function of time. The switching frequency 31 can be changed in a frequency ramp 32 and a subsequent further frequency ramp 33. The frequency ramp 32 can be an ascending frequency ramp. The further frequency ramp 33 can be a descending frequency ramp. The control device 16 can be configured to increase the switching frequency in the frequency ramp 32 in a first frequency sweep and to reduce the switching frequency again in the further frequency ramp in a second frequency sweep. The sequence of two frequency ramps 32, 33 or of more than two frequency ramps can be used for data transmission.

Alternatively to the frequency ramp 33, a rectangular function can also be used.

An analogue value can be coded in a gradient of the frequency ramps 32, 33, that is to say a rate of change of the switching frequency, and transmitted across the galvanic isolation of the converter circuit.

A digital value can be coded in the gradient of the frequency ramps, a positive or negative gradient of successive frequency ramps, etc. For example, the control device 16 can change the switching frequency in at least a first frequency ramp in order to transmit a data bit with a logical value '0'. The control device 16 can change the switching frequency in at least a second frequency ramp in order to transmit a data bit with a logical value '1'. The control device 16 can keep the switching frequency constant or change it in at least a third frequency ramp if no information is transmitted.

The frequency ramps 32, 33 are defined by the control device 16 in dependence on the information to be transmitted. The frequency ramps 32, 33 can be so defined by the control device 16 that a mean of the output current of the LED converter, averaged over the time in which the information is transmitted, is equal to the mean of the output current of the LED converter in a time interval in which no information is transmitted.

FIG. 3 shows by way of example the sequential transmission of information in a sequence of two data bits by modulation of a switching frequency 41.

In a first time interval 47, a first data bit with a first logical value is transmitted. The switching frequency is changed in at least one frequency ramp 42, 43.

In a second time interval 48, a second data bit with a second logical value is transmitted. The switching frequency is changed in at least one further frequency ramp 44, 45. The at least one second frequency ramp 44, 45 is different from the at least one frequency ramp 42, 43. The gradient of the at least one further frequency ramp 44, 45 can be different from the gradient of the at least one frequency ramp 42, 43 in order to indicate that a data bit with a different logical value is being transmitted.

In a third time interval 49, no information is transmitted. The switching frequency can have a constant value 46 or can be changed in yet a further frequency ramp which is different from the frequency ramps 42-45.

The frequency ramps 42, 43 can be so defined that a mean of the output current during the transmission of the first data bit, averaged over the first time interval 47, is equal to the output current that is present when no information is being transmitted. The further frequency ramps 44, 45 can be so defined that a mean of the output current during the transmission of the second data bit, averaged over the second time interval 48, is equal to the output current that is present when no information is being transmitted.

A data bit or an analogue value can be transmitted not only in two or more than two frequency ramps but also in only one frequency ramp, as is shown in FIG. 4.

FIG. 4 shows by way of example the sequential transmission of information in a sequence of three data bits by modulation of a switching frequency 51. In a first time interval 62, no information is transmitted. The switching frequency can be kept at a constant value 52. In a second time interval 63, a data bit with a first logical value is transmitted. The switching frequency is changed in a frequency ramp 53 which has a first gradient. In a third time interval 64, a data bit with a second logical value which is different from the first logical value is transmitted. The switching frequency is changed in a frequency ramp 54 which has a second gradient which is different from the first gradient. In a fourth time interval 65, a data bit with a second logical value is transmitted. The switching frequency is changed in a frequency ramp 55 which has the second gradient. In a fifth time interval 66, no information is transmitted. The switching frequency can be kept at a constant value 56.

The frequency ramps 53-55 can each be so defined that a mean of the output current, averaged over the corresponding frequency ramp, corresponds to a predetermined desired value. The value of the output current can correspond to the output current that is provided by the LED converter when no information is being transmitted in time intervals 62, 66.

The modulation of the switching frequency can be detected on the secondary side, for example on an output side of the LED converter or in an LED module. Depending on the transmitted information, a control function or regulating function can be performed on the output side of the LED converter or in the LED module.

While the information can be coded in different gradients of frequency ramps, a large number of other codes can be used. For example, the direction of the frequency ramp, that is to say an ascending or descending frequency ramp, can be used for coding the information. At least one start frequency and/or an end frequency and/or a duration of the frequency ramp can be used for coding the information.

While the switching frequency can be kept constant when no information is to be transmitted, the switching frequency can be modulated in a time interval in which no information is transmitted, in order to improve the EMV behaviour of the operating device. For example, the switching frequency can be changed in a sequence of frequency ramps when no information is being transmitted. This sequence of frequency ramps can differ from the frequency ramps in which information is transmitted. The modulation of the switching frequency can be changed in order to transmit information.

Figure 5:
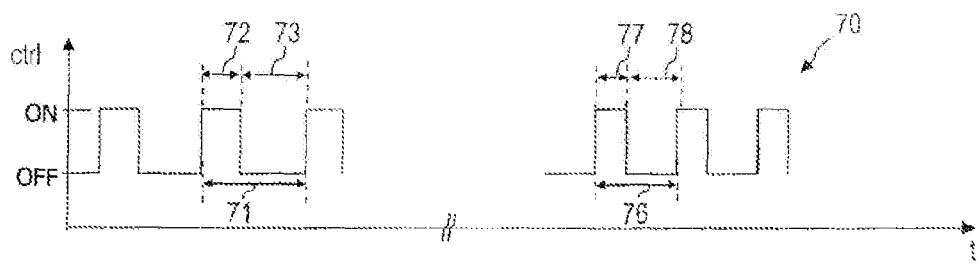
FIG. 5 shows a control signal for controlling a controllable switching means in an LED converter according to one exemplary embodiment.

FIG. 5 shows a control signal 70 generated by the control device 16 of an LED converter 3 according to one exemplary embodiment. While the switching frequency in a frequency ramp is changed, the controllable switching means 15 of the converter circuit is repeatedly switched in a clocked manner. The control device 16 can be configured to determine a time interval 71, 76 between successive switch-on operations or between successive switch-off operations in each case in dependence on the value the switching frequency is to have at the corresponding time. The time interval 71, 76 between successive switch-on operations or between successive switch-off operations is the inverse of the switching frequency, which is changed in the frequency ramp. In order to change the switching frequency in a frequency ramp in which the switching frequency is increased, the control device can adjust the time interval 76 between successive switch-on operations or between successive switch-off operations at a later time to a shorter value than the time interval 71 between successive switch-on operations or between successive switch-off operations at an earlier time in the same frequency ramp.

The control device 16 can change an on time 72, 77, for which the controllable switching means is switched on, and/or an off time 73, 78, for which the controllable switching means is switched off, in a time-dependent manner in order to modulate the switching frequency. The control device 16 can shorten the on time 72, 77 during a frequency sweep in which the switching frequency is increased in a frequency ramp with a positive gradient. The control device 16 can shorten the off time 73, 78 during a frequency sweep in which the switching frequency is increased in a frequency ramp with a positive gradient.

The change of the time interval 71, 76 between successive switching cycles, the change of the on time 72, 77 and/or the change of the off time 73, 78 as a function of time can be determined by the control device 16 on the basis of a characteristic diagram or by calculation. Depending on the information to be transmitted, different characteristic diagrams or procedures for determining by calculation the time interval 71, 76 between switching cycles, the on time 72, 77 and/or the off time 73, 78 can be used.

In exemplary embodiments, the control device 16 can be configured to determine, in dependence on the information to be transmitted, how the switching frequency, the time interval 71, 76 between successive switching cycles, the on time 72, 77 and/or the off time 73, 78 should be changed as compared with the value that is set when no information is being transmitted. A characteristic diagram or a procedure for determination by calculation can define the change of the switching frequency, the time interval 71, 76 between successive switching cycles, the on time 72, 77 and/or the off time 73, 78 as compared with the value that is set when no information is being transmitted. This facilitates the use of the information transmission by modulation of the switching frequency in combination with a servo loop which uses the switching frequency as the correcting variable. The switching frequency in the state in which no information is being transmitted can be set, for example, by the servo loop as the correcting variable which regulates an output current of the LED converter. On the basis of a characteristic diagram or by means of procedures of calculation, the control device 16 can determine how the switching frequency is to be changed as compared with the value set by the servo loop for transmission of the information.

Figure 6:
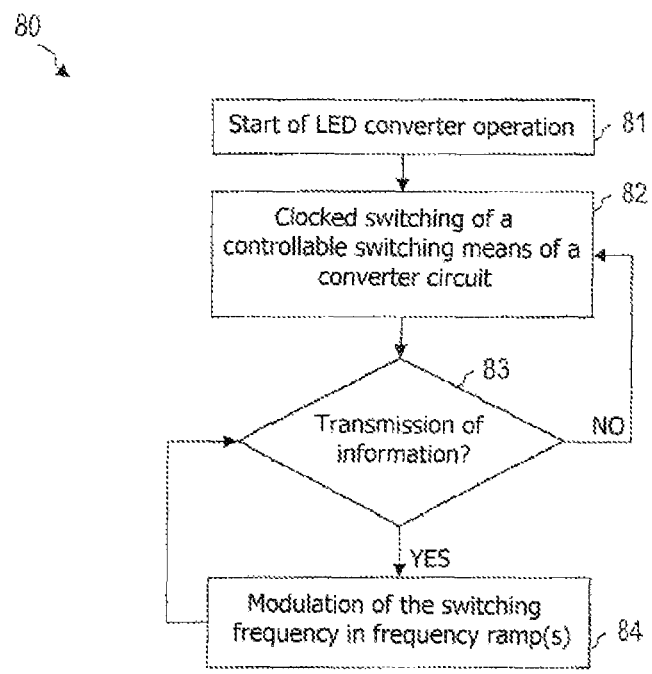
FIG. 6 is a flow diagram of a method according to one exemplary embodiment.

FIG. 6 is a flow diagram of a method 80 according to one exemplary embodiment. The method can be carried out automatically by means of an LED converter or a system according to one exemplary embodiment.

In step 81, operation of the LED converter is started.

In step 82, a controllable switching means of a converter circuit can be switched in a clocked manner. The controllable switching means can be arranged on a primary side of the converter circuit. The controllable switching means can be switched in a clocked manner by a control device in such a manner that an output current of the LED converter is set to a desired value.

In step 83, it can be checked whether information is to be transmitted across a potential barrier. If no information is to be transmitted, the method can be continued at step 82. If information is to be transmitted, the method will be continued at step 84.

In step 84, the switching frequency of the controllable switching means is modulated in dependence on the information to be transmitted. The switching frequency can be changed in at least one frequency ramp in order to transmit an analogue value or at least one data bit. The switching frequency can be modulated in such a manner that a temporal mean of the output current of the LED converter remains unchanged as compared with the state in which no information is transmitted. After the information has been transmitted, the method can return to step 83.

The modulation of the switching frequency of the primary-side controllable switching means can be detected in dependence on a modulated signal, for example an AC signal component of a current or voltage, on the output side of the LED converter or on an LED module. A demodulator can monitor a voltage or a current in order to detect the modulation of the switching frequency of the primary-side controllable switching means. The demodulator can monitor an LED current. The demodulator can monitor a voltage at a secondary coil of the converter circuit. The demodulator can monitor a coil current of the secondary coil of the converter circuit. The method can comprise the execution of at least one control or regulating function in dependence on the transmitted information.

Modulation of the switching frequency for information transmission can be used in the case of a clocked converter circuit. Not only the switching frequency of one controllable switching means but also the switching frequency of at least two controllable switching means can be modulated, as will be described in greater detail by means of FIG. 7 and FIG. 8.

Figure 7:
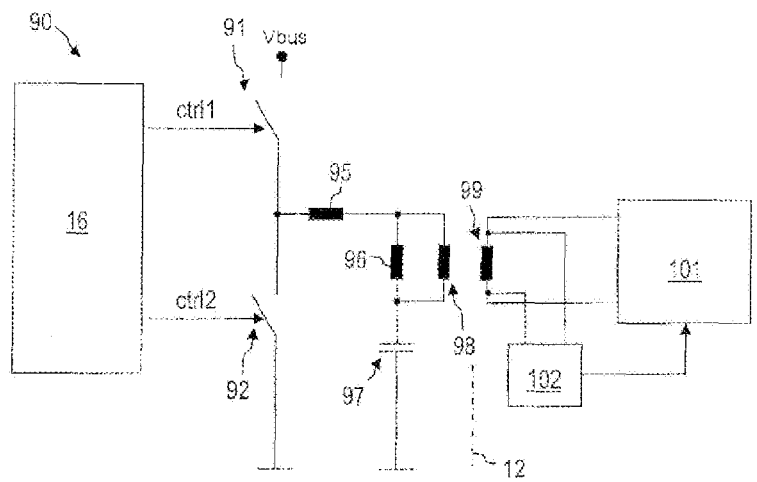
FIG. 7 is a circuit diagram of an LED converter according to one exemplary embodiment.

FIG. 7 shows an exemplary embodiment of an LED converter having a converter circuit 90 which is in the form of an LLC resonant converter with half-bridge drive.

The converter circuit 90 comprises a primary side and a secondary side. There is potential separation between the primary side and the secondary side. A transformer with a primary coil 98 and a secondary coil 99 can be provided for the separation. The converter circuit 90 can be used in the LED converter 3 or in another operating device for operating LEDs. The converter circuit 90 acts as a DC/DC converter. The secondary side can be a SELV region which is separated from the primary-side region by a SELV barrier 12.

The primary side comprises an LLC resonant circuit which is in the form of a series resonant circuit. The LLC resonant circuit has a first inductor 95, a second inductor 96 and a capacitor 97 in a series circuit. At least one of the inductors 95, 96 can be a parasitic inductor or can be realised by the inductor of the primary coil 98 of the transformer. According to general terminology in this technical field, the expression "LLC resonant circuit" or "LLC resonant converter" is so used that it denotes a resonant circuit having two inductors and a capacitor or a corresponding converter circuit, it being immaterial whether the inductor 96 is connected between the inductor 95 and the capacitor 97 or the capacitor 97 is connected between the inductive elements 95 and 96. The second inductor 96 is shown symbolically and can be the inductor of the primary coil 98 of the transformer. Alternatively or in addition, the first inductor 95 can also be integrated into the transformer as a leakage inductor. The second inductor 96 can be the main inductor of the resonant circuit, the inductance of which is greater than that of the first inductor 95. Other configurations of the LLC resonant circuit are possible. For example, the capacitor 97 can be connected between the inductors 95 and 96.

The primary-side circuit comprises a half-bridge having a first switching means 91, which can be a power switch, and a second switching means 92, which can be a power switch. The first switching means 91 and the second switching means 92 can be identical. The half-bridge can be in the form of a symmetrical half-bridge. The switching means can be in the form of field effect transistors, for example in the form of MOSFETs. The resonant circuit is connected to a node between the first switching means 91 and the second switching means 92. The resonant circuit is connected to the middle of the half-bridge between the two switching means 91 and 92. A first pin of the first inductor 95 of the resonant circuit can be connected to the node between the first switching means 91 and the second switching means 92 of the half-bridge circuit. A second pin of the first inductor 95 can be connected to a first pin of the second inductor 96 of the resonant circuit. A second pin of the second inductor 96 of the resonant circuit can be connected to a first pin of the capacitor 97. A shunt resistor can be connected between the second switching means 92 and a reference potential, for example earth, in order, for example, to keep switch-off times in the case of a fault switch-off short.

During operation of the converter circuit 90, the control device 16 controls the first switching means 91 and the second switching means 92. Each of the switching means can be switched with the same switching frequency. The control device 16 can control the first switching means 91 and the second switching means 92 in such a manner that always a maximum of one of the two switching means is conductively connected.

For the transmission of information, such as, for example, status, brightness, colour or also operational state information, the control device 16 can modulate the switching frequency with which the first switching means 91 and the second switching means 92 are switched in a clocked manner. The switching frequency of the first switching means 91 and the switching frequency of the second switching means 92 can be changed or otherwise modulated in at least one frequency ramp. Modulation of the switching frequency can take place in dependence on the information to be transmitted.

On an output side of the LED converter, for example in a SELV region, a demodulator 102 can be provided. The demodulator 102 can evaluate a voltage at the secondary coil 99 or a coil current of the secondary coil 99 of the transformer, in order to detect whether the switching frequency of the controllable switching means 91, 92 is modulated. The demodulator 102 can monitor the way in which a frequency of the coil voltage of the secondary coil 99 changes. The demodulator 102 can be configured to detect a modulation of the switching frequency of the controllable switching means 91, 92.

The demodulator 102 can be an integrated semiconductor circuit, which performs further control or regulating functions. The demodulator 102 can be configured to control or regulate a further converter 101 in dependence on the information transmitted across the potential barrier.

Figure 8:
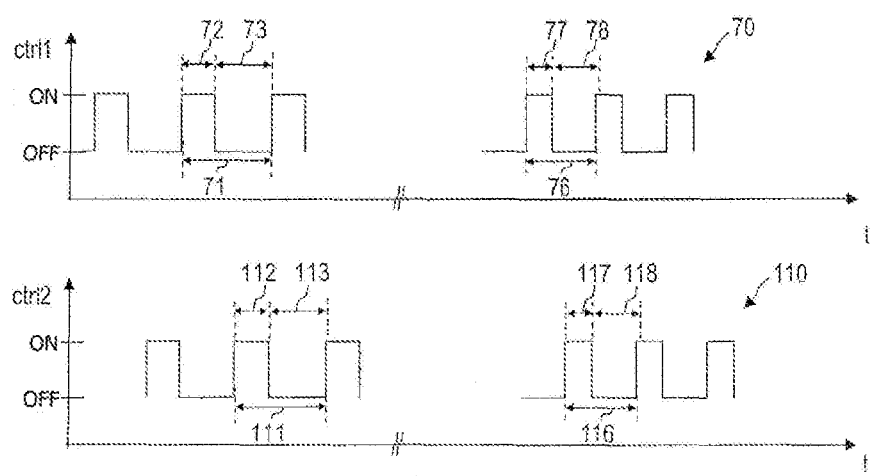
FIG. 8 shows control signals for controlling a first controllable switching means and a second controllable switching means of a half-bridge circuit of an LED converter according to one exemplary embodiment.

FIG. 8 shows a first control signal 70 which can be generated by the control device 16 for controlling a first switching means 91 of a half-bridge, and a second control signal 110 which can be generated by the control device 16 for controlling a second switching means 92 of the half-bridge. The control device 16 can be so configured that always a maximum of one of the controllable switching means 91, 92 of the half-bridge is conductively connected.

In order to modulate both a switching frequency of the first switching means 91 and a switching frequency of the second switching means 92, the control device 16 can determine a time interval 71, 76, 111, 116 between successive switch-on operations or between successive switch-off operations in each case in dependence on whether information is to be transmitted and what information is to be transmitted. The time interval 71, 76, 111, 116 between successive switch-on operations or between successive switch-off operations can be changed automatically as a function of time by the control device 16 in dependence on the information to be transmitted, in order to modulate the switching frequency.

In order to modulate both a switching frequency of the first switching means 91 and a switching frequency of the second switching means 92, the control device 16 can determine an on time 72, 77 for which the first switching means 91 is switched on and an on time 112, 117 for which the second switching means is switched on, in dependence on whether information is to be transmitted and what information is to be transmitted. The on time 72, 77 for which the first switching means 91 is switched on and the on time 112, 117 for which the second switching means is switched on can be changed automatically in a time-dependent manner by the control device 16 in dependence on the information to be transmitted, in order to modulate the switching frequency.

Alternatively or in addition, the control device 16 can determine an off time 73, 78 for which the first switching means 91 is switched off and an off time 113, 118 for which the second switching means is switched off, in dependence on whether information is to be transmitted and what information is to be transmitted. The off time 73, 78 for which the first switching means 91 is switched off and the off time 113, 118 for which the second switching means is switched off can be changed automatically in a time-dependent manner by the control device 16 in dependence on the information to be transmitted, in order to modulate the switching frequency.

While exemplary embodiments have been described with reference to the figures, modifications can be made in further exemplary embodiments. While the modulation of the switching frequency can take place by changing the switching frequency in at least one frequency ramp, other modulation techniques can also be used for modulating the switching frequency. When the switching frequency is changed in at least one frequency ramp, the at least one frequency ramp can be a linear or a non-linear frequency ramp.

A demodulation of the transmitted information can take place not only on a secondary side of the LED converter but also in an LED module or another illuminant that comprises at least one light-emitting diode.

The control device of the LED converter according to exemplary embodiments can be in the form of an integrated semiconductor circuit. The control device can be in the form of an application-specific integrated circuit (ASIC), in the form of a controller, in the form of a microcontroller, in the form of a processor, in the form of a microprocessor or in the form of another chip.

Inductors and capacitors of the converter circuit can each be formed by corresponding inductive or capacitive elements, for example in the form of coils or capacitors. It is, however, also possible for inductors, for example one inductor of an LLC resonant circuit or both inductors of the LLC resonant circuit of an LLC resonant converter, to be in the form of a leakage inductor.

LED converters, methods and systems according to exemplary embodiments can be used for transmitting information across a SELV barrier, without being limited thereto.

The invention claimed is:

1. An LED converter, comprising
a converter circuit with a potential barrier providing potential separation, wherein the converter circuit comprises at least one controllable switch;
a control device controlling the at least one controllable switch with a clock the control device modulating a switching frequency of the clock and controlling the at least one controllable switch to transmit information across the potential barrier, the information comprising a sequence of data bits; and
a demodulator receiving the information comprising the sequence of data bits and controlling the LED converter based on the information comprising the sequence of data bits.

2. The LED converter according to claim 1,
wherein the control device changes the switching frequency in at least one frequency ramp in order to transmit the information.

3. The LED converter according to claim 2,
wherein a temporal mean of an output current of the LED converter during the at least one frequency ramp corresponds to a predetermined LED current.

4. The LED converter according to claim 3,
wherein the control device modulates the switching frequency of the controllable switch so the temporal mean of the output current of the LED converter in a time interval in which information is transmitted is substantially equal to a further time interval in which no information is transmitted.

5. The LED converter according to claim 1,
wherein the control device modulates the switching frequency of the at least one controllable switch in dependence on the sequence of data bits.

6. The LED converter according to claim 1,
wherein the converter circuit comprises an LLC resonant converter, and
wherein the control device modulates the switching frequency of a first controllable switch and of a second controllable switch of a half-bridge circuit in order to transmit the information.

7. The LED converter according to claim 1,
wherein the demodulator is coupled with a secondary coil of the converter circuit.

8. The LED converter according to claim 1,
wherein the control device transmits the information to an illuminant that comprises at least one light-emitting diode.

9. An LED converter system comprising:
a converter circuit with a potential barrier providing potential separation, wherein the converter circuit comprises at least one controllable switch;
a control device controlling the at least one controllable switch with a clock, the control device modulating a switching frequency of the clock and controlling the at least one controllable switch to transmit information across the potential barrier, the information comprising a sequence of data bits; and
a demodulator receiving the information comprising the sequence of data bits and controlling the LED converter based on the information comprising the sequence of data bits, and
an illuminant that comprises at least one light-emitting diode and which is connected to the LED converter.

10. System according to claim 9,
wherein the illuminant comprises at least one integrated semiconductor circuit for demodulating the information.

11. System according to claim 10,
wherein the demodulator is configured to control or regulate a further converter in dependence on the transmitted information.

12. System according to claim 11,
wherein the transmitted information is status, brightness, colour or operational state information.

13. System according to claim 9,
wherein the illuminant is an LED module.

14. A method for controlling a converter circuit of an LED converter which comprises at least one controllable switch, wherein the method comprises:
controlling the at least one controllable switch with a clock;
switching the at least one controllable switch at an input side of the LED converter in a clocked manner, and
modulating a switching frequency of the at least one controllable switch to transmit information to an output side of the LED converter across a potential barrier of the converter circuit;
demodulating received information at the output side of the LED converter the received information comprising a sequence of data bits; and
controlling the LED converter based on the received information.

* * * * *